(No Model.) 4 Sheets—Sheet 1.
H. MILLER.
SOLDERING APPARATUS.
No. 492,986. Patented Mar. 7, 1893.
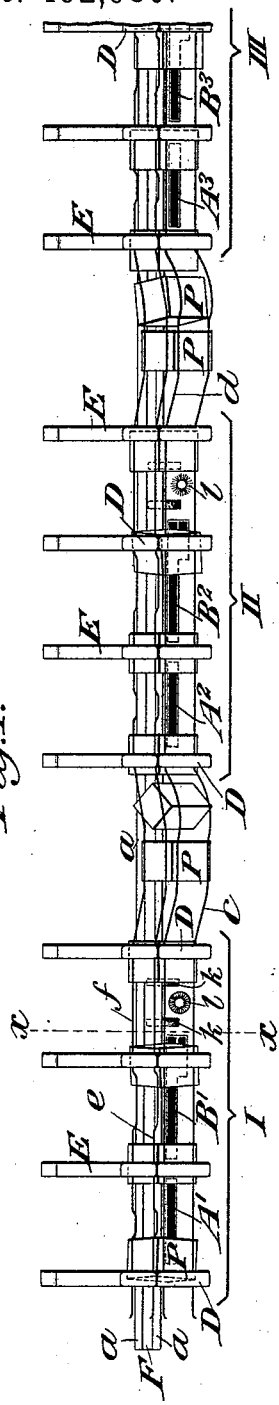
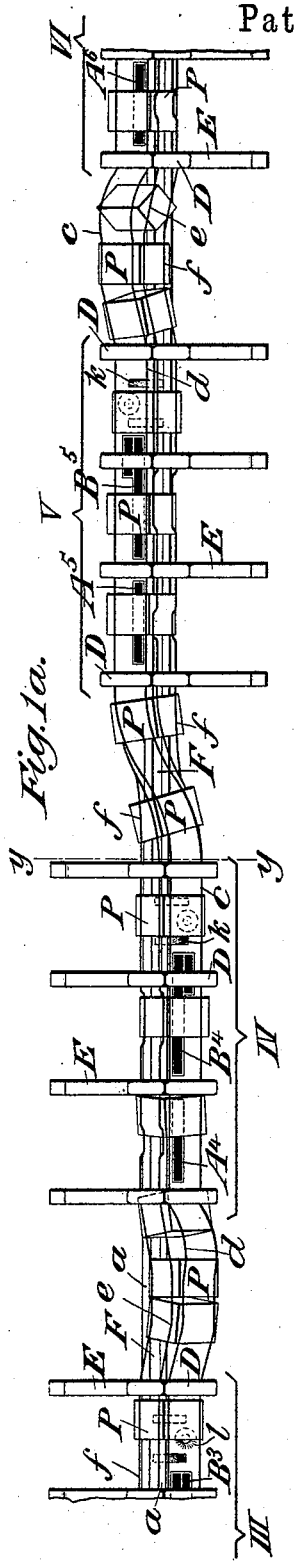
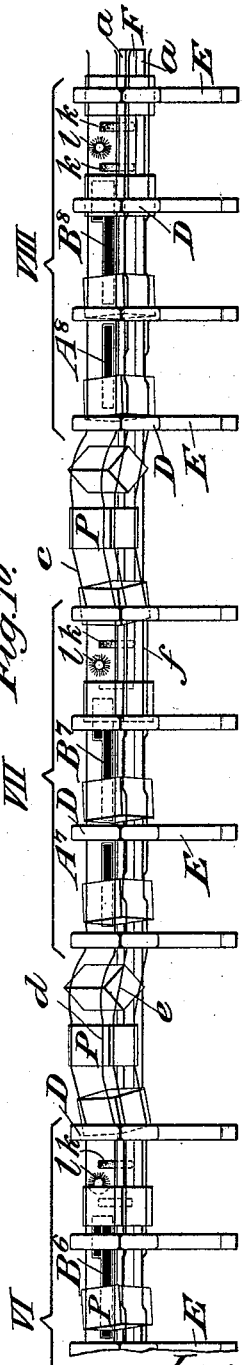
Witnesses:
Inventor:
Herman Miller
by attorneys

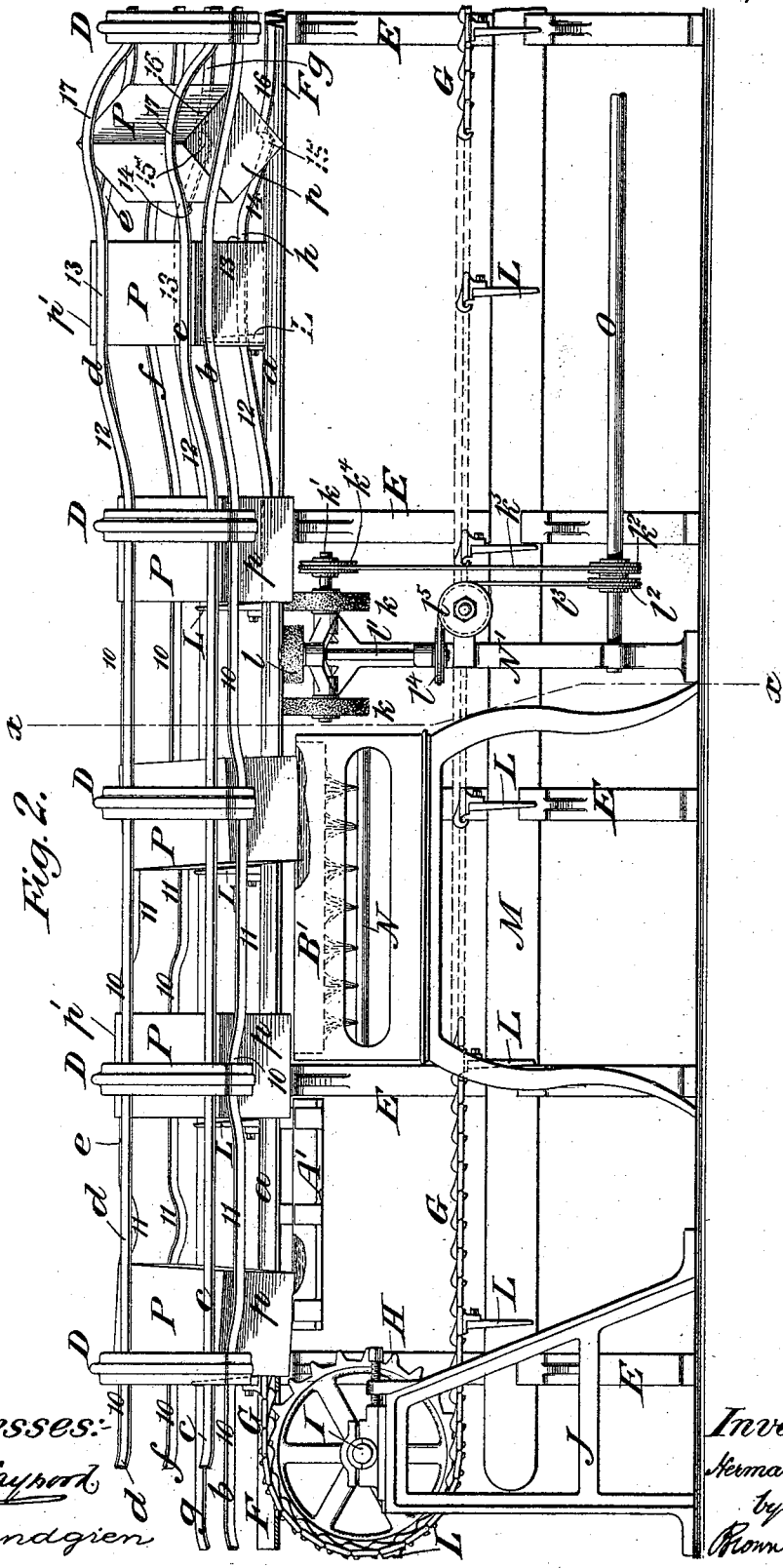

(No Model.) 4 Sheets—Sheet 3.
H. MILLER.
SOLDERING APPARATUS.
No. 492,986. Patented Mar. 7, 1893.
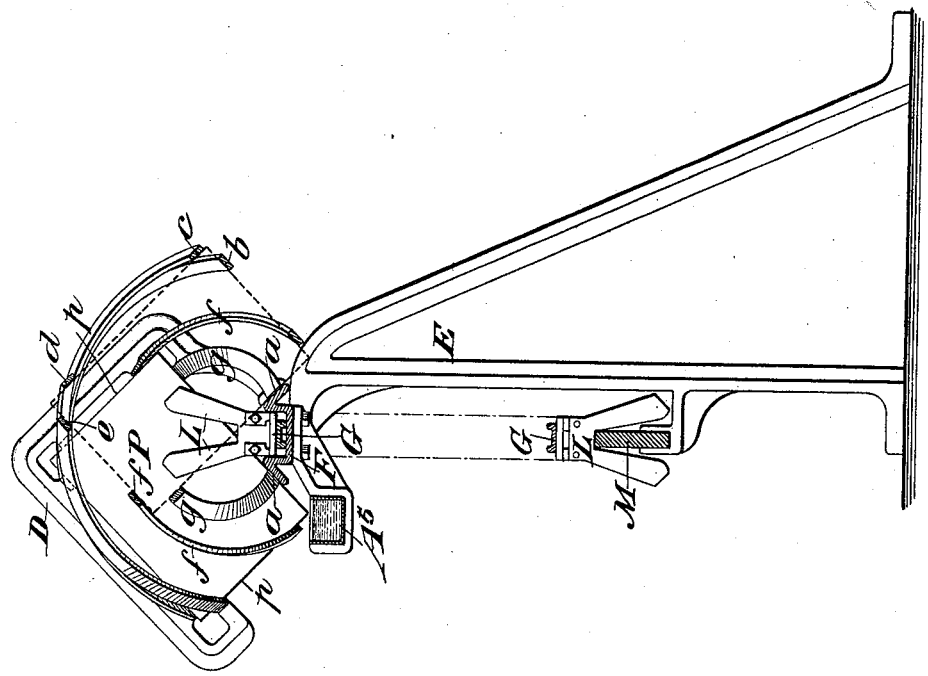
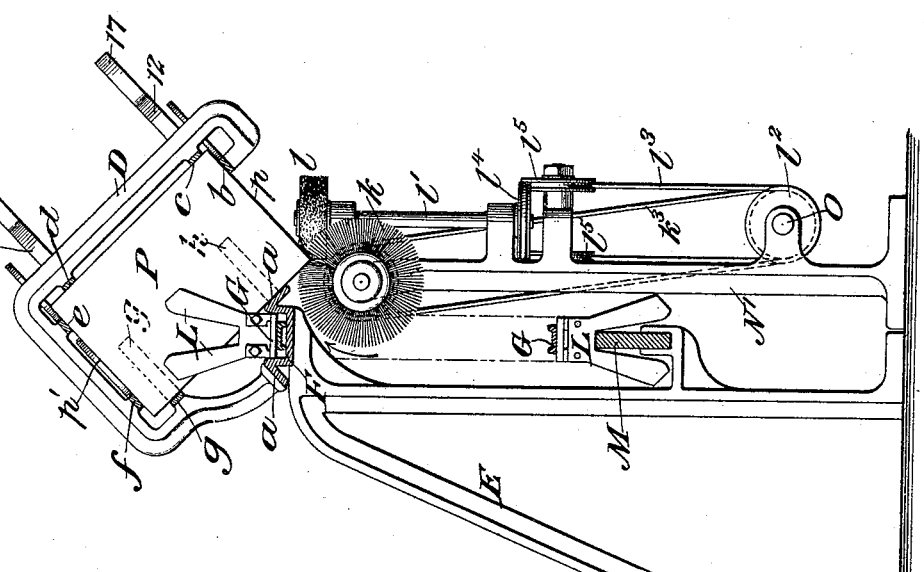
Witnesses:-
Inventor:-
Herman Miller
by attorneys (No Model.) 4 Sheets—Sheet 4.
H. MILLER.
SOLDERING APPARATUS.
No. 492,986. Patented Mar. 7, 1893.
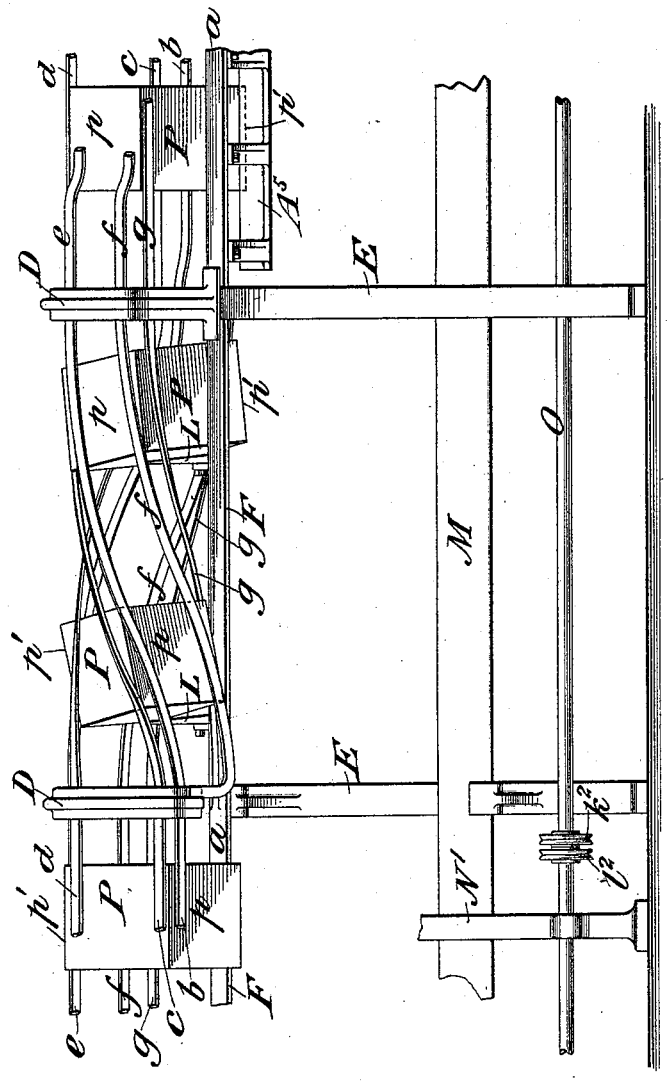
Witnesses:—
D. N. Hayford
C. F. Sundgren
Inventor:—
Herman Miller
by attorneys
Brown & Seward

UNITED STATES PATENT OFFICE.

HERMAN MILLER, OF NEW YORK, N. Y.

SOLDERING APPARATUS.

SPECIFICATION forming part of Letters Patent No. 492,986, dated March 7, 1893.

Application filed November 12, 1892. Serial No. 451,792. (No model.)

*To all whom it may concern:*

Be it known that I, HERMAN MILLER, of the city and county of New York, in the State of New York, have invented a new and useful Improvement in Soldering Apparatus, of which the following is a specification.

This improvement relates to apparatus for soldering the corner seams of sheet metal cans, especially cans of square or polygonal form, in which the can to be soldered is moved past and has its seams which are to be soldered dipped into vessels containing melted solder or first into a vessel containing acid or flux and afterward into vessels containing melted solder.

In the apparatus for which were granted to me Letters Patent No. 243,278 dated June 21, 1881, the acid vessels and solder vessels, each equal in number to the number of sides of a can, are arranged in a row under a stationary track along which the cans are pushed and alternating portions of which are so depressed and elevated as to cause the cans to be dipped in and lifted out of the several vessels in succession by the movements of the cans along the track. At intervals in the said track there are stops against which the cans are brought while by the act of pushing them forward they are turned over for the purpose of presenting different corners or edges in position for dipping in the flux and solder. The apparatus illustrated in those Letters Patent is only capable of soldering seams at one end, as the top or bottom, of a can. The can, after such soldering has been performed in the machine, requires to be taken out and turned end for end and again put into and run through the machine.

The object of the present invention is to enable all the seams around the top or bottom edges of a can to be soldered during one run of the can through the machine without any handling from the time of its being placed in the machine to solder the first seam at one end and the soldering of the last seam at the other end. This result may be accomplished by the machine which is the subject of my patent No. 242,631 dated June 7, 1881, but in the last mentioned machine tilting holders are required for the cans and the machine is somewhat complicated. According to the present invention holders are dispensed with as in my patent first hereinabove mentioned and the turning of the can end for end as well as the turning of it to present the several sides of either end to the flux or solder vessels is all effected by the mere movement of the can along tracks through a proper formation of the tracks themselves.

I will now proceed to describe my invention in detail with reference to the accompanying drawings and afterward point out its novelty in claims.

Figures 1, $1^a$, $1^b$ represent together a full length plan of the principal parts of a machine embodying my invention each figure representing a portion of the length of the machine. Fig. 2 represents a side elevation on a larger scale than Figs. 1, $1^a$, $1^b$, and in detail that part of the machine which is shown at the left hand of Fig. 1 which is the end of the machine where the operation is commenced. Fig. 3 represents a transverse vertical section of the machine in the line $xx$ of Figs. 1 and 2 viewed from the left. Fig. 4 represents a transverse vertical section of the machine in the line $yy$ of Fig. $1^a$ viewed from the left. Fig. 5 is a side view of the middle portion of the machine.

Similar letters and numbers of reference designate corresponding parts in all the figures.

$A'$ $A^2$ $A^3$ $A^4$ $A^5$ $A^6$ $A^7$ $A^8$ designate vessels containing flux and $B'$ $B^2$ $B^3$ $B^4$ $B^5$ $B^6$ $B^7$ $B^8$ vessels containing solder, the number of said vessels of either kind being equal to twice the number of sides of each polygonal can to be soldered. The machine represented being for soldering square cans includes eight flux vessels and eight soldering vessels, four of each for one end and four of each for the other end of the can. The first four vessels $A'$ $A^2$ $A^3$ $A^4$ and $B'$ $B^2$ $B^3$ $B^4$ constituting a first series are arranged in line with each other and the second four of each kind $A^5$ $A^6$ $A^7$ $A^8$ and $B^5$ $B^6$ $B^7$ $B^8$ constituting a second series are also arranged in line with each other but a little to one side of the line of the first four as may be understood by reference to Fig. $1^a$. Over these rows of flux and solder vessels is arranged the track in which the cans P P run. This track, as may be understood by reference to Figs. 1, $1^a$, $1^b$, consists of eight consecutive sections numbered respectively I, II, III, IV, V, VI, VII, VIII, and intermediate connecting sections corresponding in position with the several flux vessels and the solder vessels.

The track is composed of a number of rails $a\ a\ b\ c\ d\ e\ f\ g$ and supporting brackets D D for supporting and guiding the cans with one of the corners downward directly over one of the lines of the flux and solder vessels, the whole being supported on standards E which are erected upon a floor or other suitable foundation. The rails $a\ a$ which are straight are formed on opposite sides of a straight horizontal base or string-piece of channel iron F which runs the whole length of the machine and is supported at intervals on the standards E which also serve as supports for the solder and flux vessels. The first series of solder and flux vessels is arranged on one side of a central line passing through the straight base F and between the rails $a\ a$ and the second series is arranged on the other side of said central line. The brackets D are bolted upon one of the rails $a$ and carry the rails $b\ c\ d\ e\ f\ g$ as may be understood by reference to Figs. 2, 3 and 4. The several rails except those $a\ a$, are, owing to the smallness of the scale of Figs. 1, $1^a$, $1^b$, represented in those figures by a single line only. The channel iron F receives and serves as a guide for the upper run of an endless belt or chain G represented as a chain which runs the whole length of the machine, along the central line above mentioned and is supported at each end of the track by one of two sprocket wheels H, of which only one is visible (see Fig. 2). The shafts I of said wheels run in bearings on standards J, one at each end of the machine. Either of the said shafts may be the driving shaft for driving the chain G. The said chain is furnished at proper intervals with pushers L, represented as forked, for the purpose of moving the cans forward on the track. The pushers L in the lower run of the chain run on a horizontal bar M which is supported on the lower parts of the standards E for the purpose of guiding the said run of the chain G. The first four sections I, II, III, IV, of the so constructed track are all alike. The portions of the rails $b\ e\ f$ which guide the ends or top and bottom of the can are composed, as shown in Figs. 1 and 2, of three elevated portions 10, and two depressed portions 11, the two depressed portions being respectively opposite the flux vessel and the soldering vessel belonging to the respective section of the track, the depressed portions being for the purpose of allowing the lower corners of the cans to drop into the flux and the solder as they are carried along by the endless chain and the elevated portions being to hold up the cans above the level of the flux and solder vessels. The four sections V, VI, VII, VIII are also all alike and are like I, II, III, IV except that the brackets are arranged on the rail $a$ on the other side of the channel iron F and that the depressed portions 11 of the first four sections incline in one direction laterally and those of the second four incline in the opposite lateral direction as may be understood by reference to Fig. $1^a$, the reason for this difference being that the can is tilted in one direction for soldering the seams at one end and in the other direction for soldering the seams of the other end as may be understood by reference to Figs. 1, $1^a$, $1^b$, 3 and 4.

In the two intermediate connecting sections of the track between the sections I, II and the sections II and III respectively, the first of the said intermediate sections being shown at the right hand of Fig. 3 and both of said sections being shown in Fig. 1, there is upon the supporting rail $a$, a short rail $h$ which rises from the first section as shown at 12 in Fig. 2, with a lateral inclination, thence runs straight for some distance as shown at 13, and farther on is depressed as shown at 14, and thence abruptly rises to form a stop 15, whence it descends again to the rail $a$ as shown at 16. The portion of the rail $g$ opposite the rail $h$ is also made, as shown in Fig. 2, with a surface configuration 12, 13, 14, 15, 16 like that of $h$, the object of such configuration being to effect the turning of the can over sidewise as will presently be more fully described, while it is moving from section I to section II so that a new corner may be presented downward in position for dipping in the flux and solder before the can arrives at the section II. The part of the rail $b$ corresponding with $h$ has a similar configuration except that it has not the stop 15. The corresponding parts of the rails $c$ and $d$ have a similar configuration as far as 13 and thence they are arched upward as shown at 17 to make room for the side corners of the can as the latter turns over. Between the sections II and III and between the sections III and IV there are intermediate sections having a configuration like that between I and II to repeat the turning of the can on its sides; and there are also for the same purpose similar intermediate sections between sections V and VI, between sections VI and VII and between VII and VIII.

Between sections IV and V the track besides deviating laterally as shown in Fig. $1^a$, to come in line with the second series of vessels $A^5$ $A^6$ $A^7$ $A^8$ and $B^5$ $B^6$ $B^7$ $B^8$, has a spiral curvature, as shown in Figs. $1^a$ and 4 but better in Fig. 5, in order to turn the cans endwise transversely to the track and so that the ends $p$ which have been directed downward for soldering during passage through the first four sections of the track may be directed upward during their passage through the next four sections and the ends $p'$ which were upward in the first four sections may be presented downward for soldering in the next four sections. This spiral curvature may be understood by imagining the rails $b\ c\ d\ e\ f\ g$ between sections IV and V to be quarter turns of screw-threads. The rails $f\ g$ are duplicated between the said sections as may be understood by reference to Fig. 5.

The solder vessels have, as represented in Fig. 2, each a gas burner N for keeping the solder therein melted. Forward of each solder vessel there are arranged two rotary brushes $k\ k$ on a horizontal shaft $k'$ (see Figs. 2 and 3) and a rotary brush $l$ intermediate to $k\ k$ on an upright shaft $l'$ the said shafts being arranged opposite each other in bearings in or on standards $N'$ which also support a horizontal driving shaft O which is arranged parallel with the general direction of the length of the track and which may extend along as great a portion of the length of the machine as desirable according as there may be one such driving shaft for each set of brushes $k\ k\ l$ or one for driving several of or all of said brushes. The said driving shaft carries for each or either set of brushes two pulleys $k^2$ and $l^2$ on which run two belts $k^3\ l^3$, the belt $k^3$ running on a pulley $k^4$ on the shaft $k^2$ for driving the brushes $k\ k$, and the belt $l^3$ running over idler pulleys $l^5$ and on a pulley $l^4$ on the shaft $l'$ for driving the brush $l$. The cans, being carried between and past these brushes, as may be understood by reference to Fig. 3, after leaving the solder cans have the superfluous solder brushed from their seams, the brushes $k\ k$ brushing it from one side of the angle of the seam and the brush $l$ brushing it from the other side of the angle.

Having now described all the details of the apparatus I will describe briefly the operation of soldering the cans therein.

The flux vessels having been supplied with flux and the solder vessels having been supplied with solder and the solder having been melted, rotary motion is given to the chain driving shaft I and to the brush driving shaft O. The cans having had their parts properly assembled, are then placed by an attendant one at a time on the rails $a\ a$ at the entrance to the track, that is to say, at the end represented at the left hand end of Figs. 1 and 2, and they are carried forward along the track by the pushers L L of the chain G. As the cans severally pass over the flux vessel $A'$ and the solder vessel $B'$ of the first section I of the machine, one corner seam is dipped into the said vessels. After the cans pass beyond the solder vessel the superfluous solder is brushed from the seam at the first set of brushes $k\ k\ l$. After passing the brushes each can is taken by the pushers which have so far moved it and pushed up the inclined rising portions 12 of the track on to the portion 13 which is so high that the pusher escapes from and passes under and clear of it leaving it temporarily arrested, as illustrated, by the second can P from the right hand end of Fig. 1. The next can is taken by the next pusher and pushed in the same way up the portions 12 on to the portions 13 where it is left in the same way by the pusher escaping from and passing under it, but as the last mentioned can is brought on to the portions 13 it pushes forward the one in front of it over the descending inclinations 14 down which it falls by its own weight until its lower side-corner is arrested, as illustrated, by the first can from the right hand end of Fig. 2, where it is overtaken by the pusher which has escaped from the can next behind it and turned over sidewise by said pusher on to the second section II of the track with its next corner seam presented in the lowest position proper for dipping into the flux and solder vessels of the second section II of the machine and for the operation of the brushes of that section. These operations of turning the can are repeated at the end of the sections I, II, III respectively preparatory to the dipping of the seams in the flux and soldering vessels of the respective series II, III, IV, each can being pushed forward through the second section of the machine by the pusher which brings it there and left between the second and third sections to be carried forward by the next succeeding pusher which escapes from the one behind it, until all the seams at at one end $p$ (see Fig. 3) have been soldered. It may be here mentioned that the object of so constructing the tracks between the several sections I, II, III, IV of the first series of elevated and depressed portions and stops and between the several sections V, VI, VII, VIII of the second series is that the cans are severally raised up high enough to permit the pusher which has carried them through one of said sections to escape and pass by them and leave them each to be pushed forward by the next one behind it and afterward turned over sidewise by the next succeeding pusher, is to give sufficient time to allow the said turning over operation to be performed more freely than can be done by merely providing a stop against which the side corners of the cans are arrested to be turned over by the pushers and without any liability to jam the cans against the stop. On the arrival of each can at the intermediate spiral section of the track between the sections IV and V, the can is turned end for end as hereinbefore explained, from the position shown in Fig. 3 to that shown in Fig. 4 and as they are carried forward through and between the sections V, VI, VII, VIII the corners of the end $p'$ are successively dipped the can being turned as before described between the successive dippings.

What I claim as my invention, and desire to secure by Letters Patent, is—

1. In a soldering apparatus the combination of a series of solder-containing vessels, a track upon which cans may be moved along and an endless belt or chain and pushers thereon for moving the cans along the said track; the said track comprising a series of elevated and depressed portions to effect the dipping of the cans into and the raising of them above the said vessels, stops for effecting the turning over of the cans sidewise by the said movement, and elevated portions behind said stops for lifting and temporarily holding the cans out of range of the pushers, substantially as and for the purpose herein set forth.

2. In a soldering apparatus the combination of a series of solder-containing vessels, a track upon which cans may be moved along and an endless belt or chain and pushers thereon for moving the cans along the said track; the said track comprising a series of elevated and depressed portions for effecting the dipping of the cans into and the raising of them above the said vessels by the said movement, stops for effecting the turning over of the cans sidewise by said movement, elevated portions behind said stops for lifting and temporarily holding the cans out of range of the pushers, and curved portions for effecting the tilting of the cans endwise transversely to the track by the said movement, substantially as and for the purpose herein set forth.

3. The combination in a can soldering apparatus of two series of solder-containing vessels arranged one series in advance of the other in lines on opposite sides of a central line, a track which runs the whole length of the said two series of vessels and upon which the cans to be soldered are supported, and an endless belt or chain and attached pushers running in said central line for pushing the cans along said track, the said track comprising a first series of elevated and depressed portions to produce the dipping of a can into and the raising of it from the solder vessels of the first series while it is inclined in one direction transversely to the track, projections for turning over the cans sidewise while so inclined, spiral portions for tilting the cans endwise to give them an opposite inclination transversely to the track, and a second series of elevated and depressed portions and stops to produce the dipping of the can into and the raising of it from the solder vessels of the second series and turning it over sidewise while at such opposite inclination, all substantially as herein set forth.

4. In a soldering apparatus the combination of a series of solder vessels, a track upon which cans may be moved, and an endless belt or chain and pushers thereon for moving cans along said track, the base of said track being formed of channel-iron the channel of which forms a guide for said belt or chain, substantially as herein described.

5. In a soldering apparatus the combination of a series of solder-containing vessels, a track upon which cans may be moved over and within said vessels, two rotary shafts with brushes and pulleys thereon arranged opposite each other in advance of each solder-containing vessel, a horizontal driving shaft arranged substantially parallel with the general direction of the track, two pulleys on said shaft and belts from said pulleys to the pulleys on said two brush shafts, substantially as herein described.

HERMAN MILLER.

Witnesses:
   FREDK. HAYNES,
   GEORGE BARRY.